(12) United States Patent
Nyenhuis

(10) Patent No.: US 8,720,180 B2
(45) Date of Patent: May 13, 2014

(54) TURBINE ENGINE FOR VEHICLE

(76) Inventor: Dirk A. Nyenhuis, Jenison, MI (US)

( * ) Notice: Subject to any disclaimer, the term of this patent is extended or adjusted under 35 U.S.C. 154(b) by 1003 days.

(21) Appl. No.: 12/814,978

(22) Filed: Jun. 14, 2010

(65) Prior Publication Data

US 2010/0313541 A1 Dec. 16, 2010

Related U.S. Application Data

(60) Provisional application No. 61/186,421, filed on Jun. 12, 2009.

(51) Int. Cl.
*F03H 1/00* (2006.01)
*H05H 1/00* (2006.01)

(52) U.S. Cl.
USPC ............. 60/202; 60/775; 60/780; 60/39.26; 60/39.3; 60/728; 60/39.53; 60/39.54; 60/39.55; 60/39.12

(58) Field of Classification Search
USPC ............. 60/202, 775, 780, 39.26, 39.3, 60/39.53–39.54, 39.12, 728
See application file for complete search history.

(56) References Cited

U.S. PATENT DOCUMENTS

| 2,804,747 | A | * | 9/1957 | Pavlecka | 60/792 |
| 3,727,401 | A | * | 4/1973 | Fincher | 60/39.35 |
| 6,263,664 | B1 | * | 7/2001 | Tanigawa et al. | 60/39.54 |
| 6,886,345 | B2 | * | 5/2005 | Ritland | 60/775 |
| 7,304,396 | B2 | * | 12/2007 | Haje et al. | 290/1 R |

* cited by examiner

*Primary Examiner* — Craig Kim
(74) *Attorney, Agent, or Firm* — McGarry Bair PC

(57) ABSTRACT

A turbine engine includes an air inlet fluidly coupleable with an air compressor subassembly. The air compressor subassembly is fluidly coupleable with a combustion subassembly. The combustion subassembly generates and combusts ionic hydrogen, and is fluidly coupleable with a mid-turbine subassembly. The mid-turbine subassembly is fluidly coupleable with a rear turbine subassembly. The rear turbine subassembly is fluidly coupleable with an exhaust outlet for exhausting combustion products from said mid-turbine subassembly. The combustion subassembly includes an electrostatic subassembly fluidly coupleable with a combustion chamber subassembly. The combustion chamber subassembly is fluidly coupleable with the mid-turbine subassembly. The air compressor subassembly can compress and humidify air. The electrostatic subassembly can generate ionic hydrogen from the compressed and humidified air, the combustion chamber subassembly can combust the ionic hydrogen, and the mid-turbine subassembly and rear turbine subassembly can rotate with the flow of combustion products therethrough.

19 Claims, 17 Drawing Sheets

TURBINE ENGINE FOR VEHICLE

CROSS-REFERENCE TO RELATED APPLICATION

This application claims the benefit of U.S. application Ser. No. 61/186,421, filed Jun. 12, 2010, which is fully incorporated by reference herein.

BACKGROUND OF THE INVENTION

1. Field of the Invention

The invention relates to vehicle powertrains. In another aspect, the invention relates to auxiliary engines. In another aspect, the invention relates to improvements in motor fuel economy.

2. Description of the Related Art

The cost of fuel for vehicles continues to rise, at times seemingly exponentially. Increases in fuel costs can have a significant impact on the cost of operating commercial vehicles and, consequently, the cost of doing business. Trucking companies, and other companies maintaining a fleet of trucks, particularly those utilizing tractor-trailer units, typically have very large fuel costs, due in large part to the number of vehicles operated and the relatively low fuel efficiency typically characterizing such vehicles. Any device or operational procedure that can improve mileage will be of significant benefit.

BRIEF DESCRIPTION OF THE INVENTION

A turbine engine includes a turbine shaft coupleable with a vehicle drive shaft, an air inlet for receiving a flow of air therethrough and fluidly coupleable with an air compressor subassembly. The air compressor subassembly compresses air flowing through the air inlet, and is fluidly coupleable with a combustion subassembly. The combustion subassembly generates and combusts ionic hydrogen, and is fluidly coupleable with a mid-turbine subassembly. The mid-turbine subassembly is coupleable with the turbine shaft, and fluidly coupleable with a rear turbine subassembly. The rear turbine subassembly is coupleable with the turbine shaft, and is fluidly coupleable with an exhaust outlet, for exhausting combustion products from said mid-turbine subassembly. The combustion subassembly includes an electrostatic subassembly fluidly coupleable with a combustion chamber subassembly. The combustion chamber subassembly is fluidly coupleable with the mid-turbine subassembly. The air compressor subassembly can compress and humidify the air. The electrostatic subassembly can generate ionic hydrogen from the compressed and humidified air, the combustion chamber subassembly can combust the ionic hydrogen, and the mid-turbine subassembly and rear turbine subassembly can rotate with the flow of combustion products therethrough. The turbine shaft and drive shaft can rotate with rotation of the mid-turbine subassembly and rear turbine subassembly.

DESCRIPTION OF AN EMBODIMENT OF THE INVENTION

Figure 1:
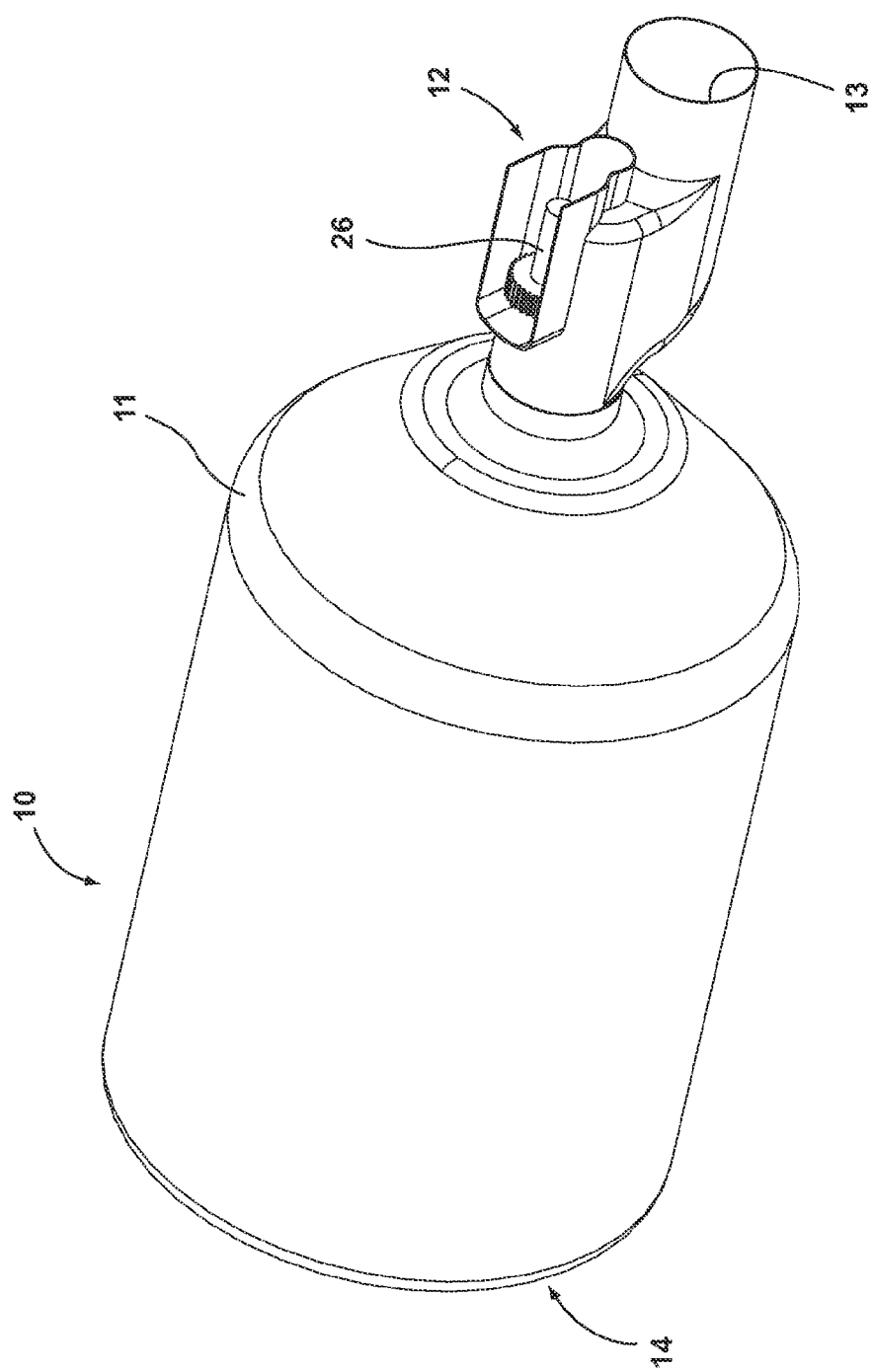
FIG. 1 is a front perspective view of a turbine engine enclosed within a housing according to an embodiment of the invention.
Figure 2:
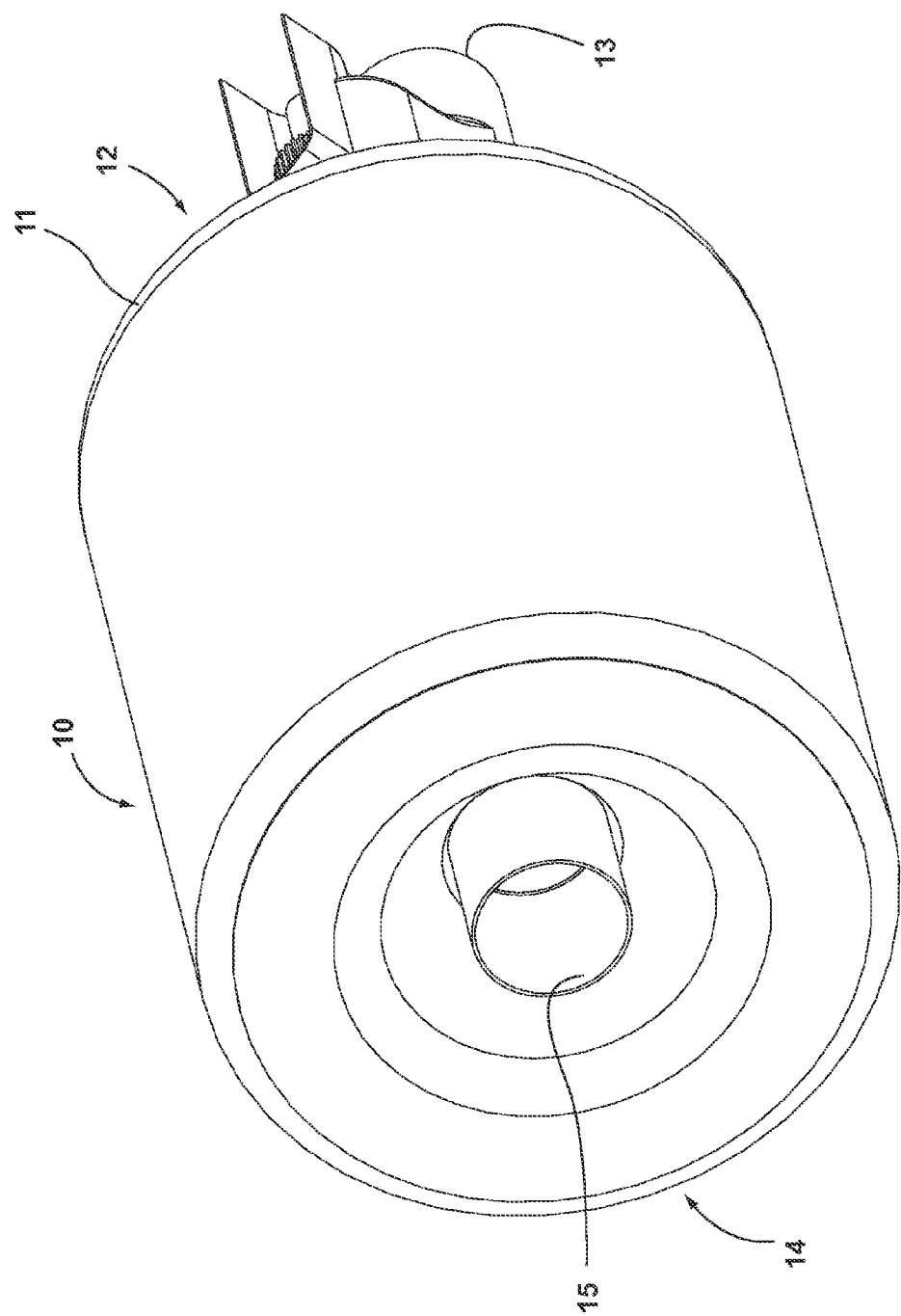
FIG. 2 is a rear perspective view of the turbine engine shown in FIG. 1.

Referring now to the drawings, FIGS. 1 and 2 illustrate an embodiment of the invention comprising a turbine engine assembly 10 enclosed within a housing 11. The housing 11 and turbine engine assembly 10 have a drive end 12 and an exhaust end 14. The drive end 12 of the housing 11 is characterized by an air inlet 13. The exhaust end of the housing 11 is characterized by an exhaust outlet 15. Thus, fluid flow is generally from the air inlet 13 to the exhaust outlet 15. As used herein, "upstream" means nearer the air inlet 13, and "downstream" means nearer the exhaust outlet 15.

Figure 3:
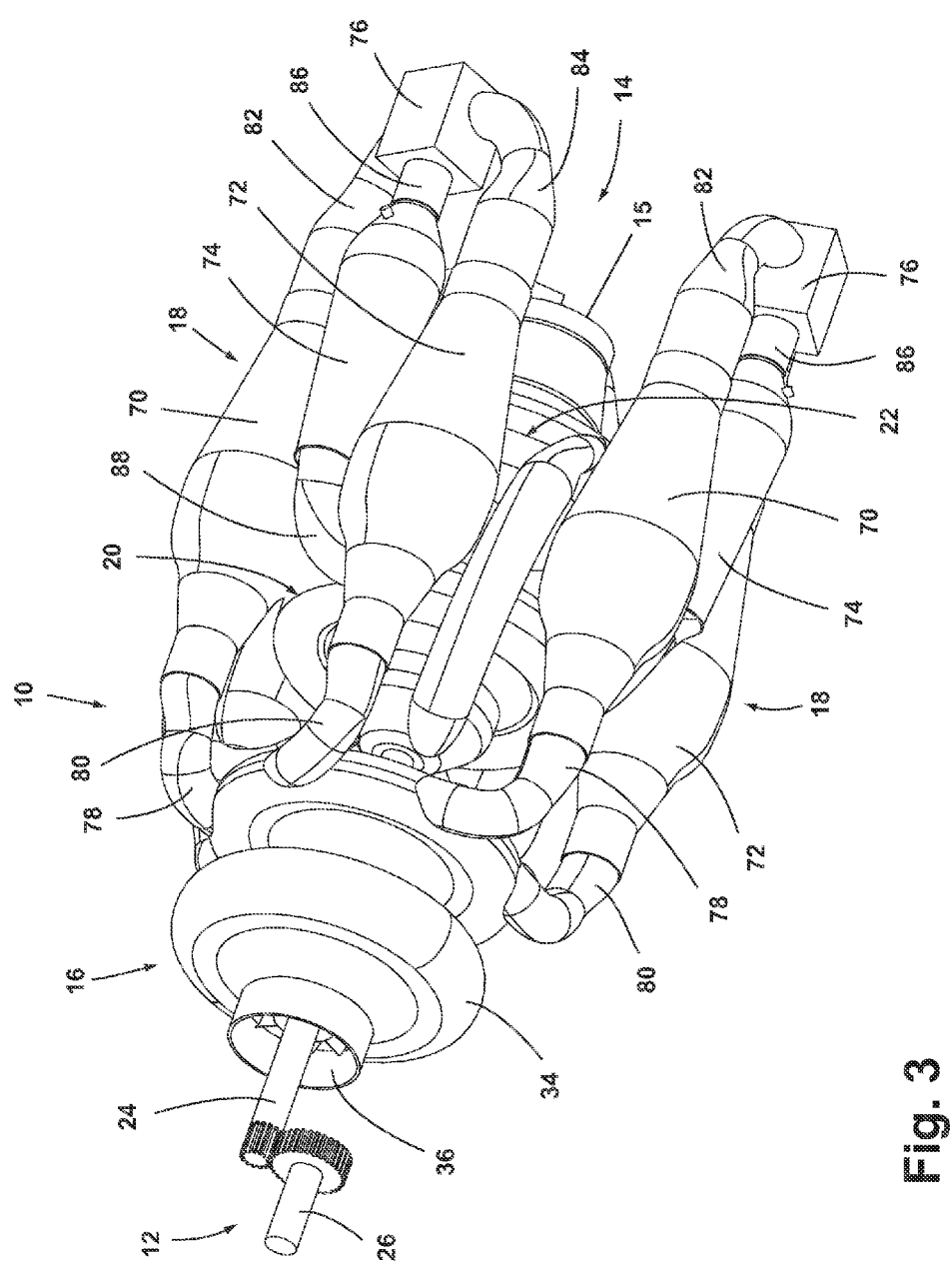
FIG. 3 is a front perspective view of the turbine engine of FIG. 1 with the housing removed for clarity.
Figure 4:
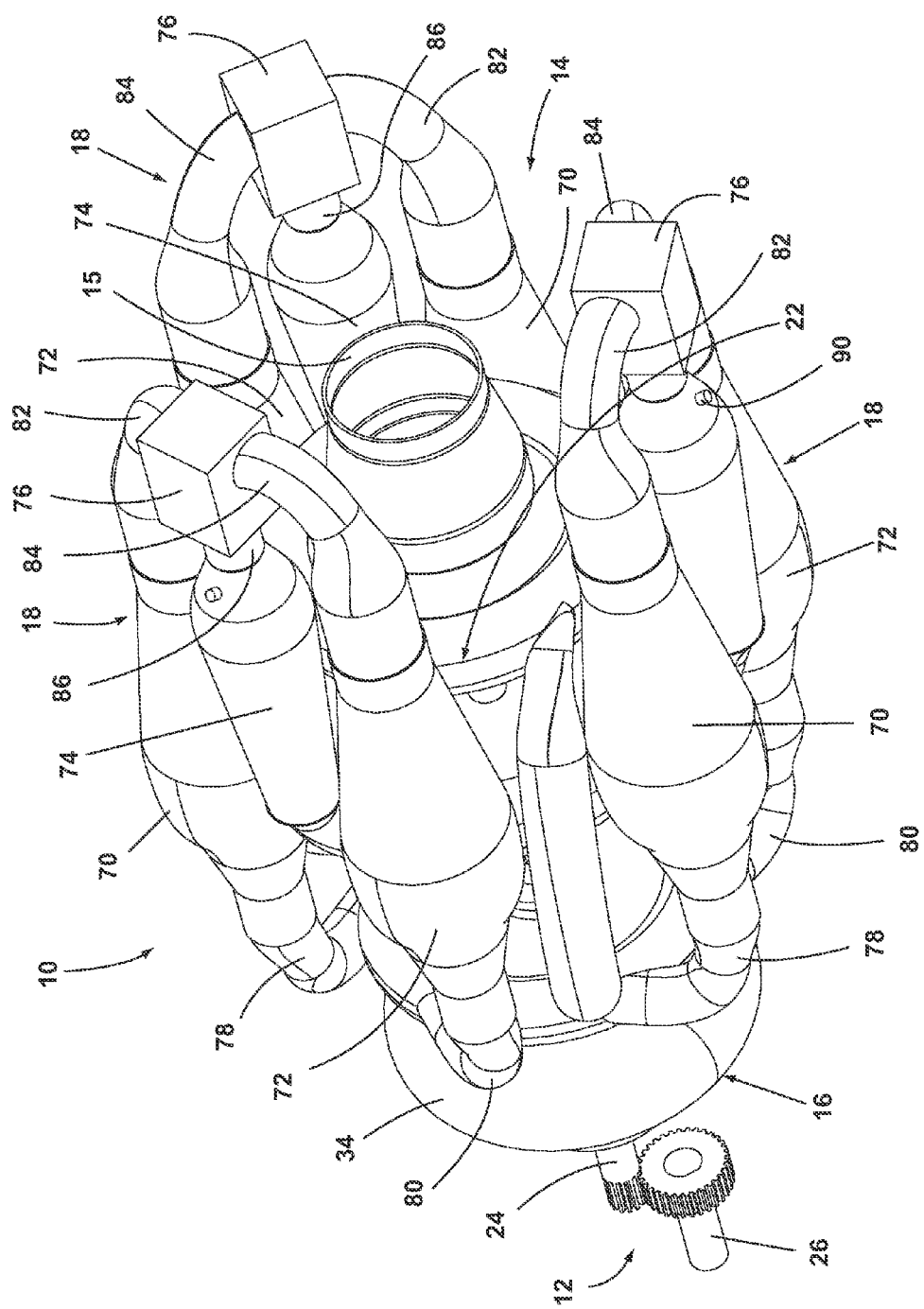
FIG. 4 is a rear perspective view of the turbine engine of FIG. 3.
Figure 5:
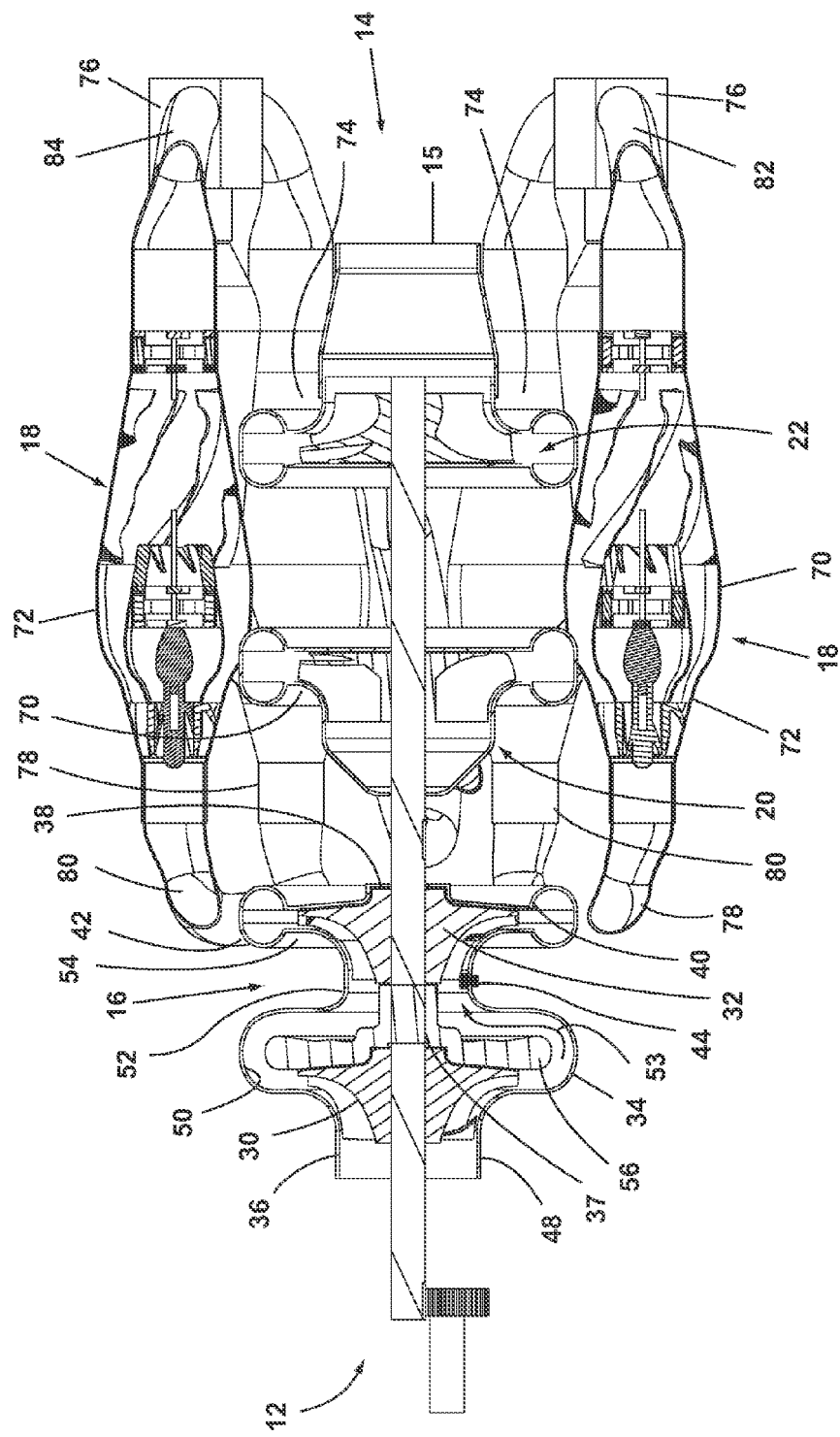
FIG. 5 is a longitudinal sectional view of the turbine engine of FIG. 3 taken along the centerline.

Referring now to FIGS. 3, 4, and 5, the turbine engine assembly 10 enclosed by the housing 11 comprises, beginning at the drive end 12, a 2-stage compressor subassembly 16, a mid-turbine subassembly 20, and a rear turbine subassembly 22, all coaxially aligned about a turbine shaft 24. The 2-stage compressor subassembly 16 includes an air inlet 36. The rear turbine subassembly 22 terminates in the exhaust outlet 15.

Fluidly coupled with the 2-stage compressor subassembly 16, and the mid-turbine subassembly 20, are a plurality of combustion subassemblies 18. The description and drawings herein disclose a turbine engine assembly 10 including 3 combustion subassemblies 18 evenly disposed about the turbine shaft 24, preferably at a spacing of 120°. A greater or fewer number of combustion subassemblies can be selected, preferably evenly disposed about a turbine shaft. The combustion subassemblies 18 can extend longitudinally generally along the lateral extent of the turbine engine assembly 10.

Figure 6:
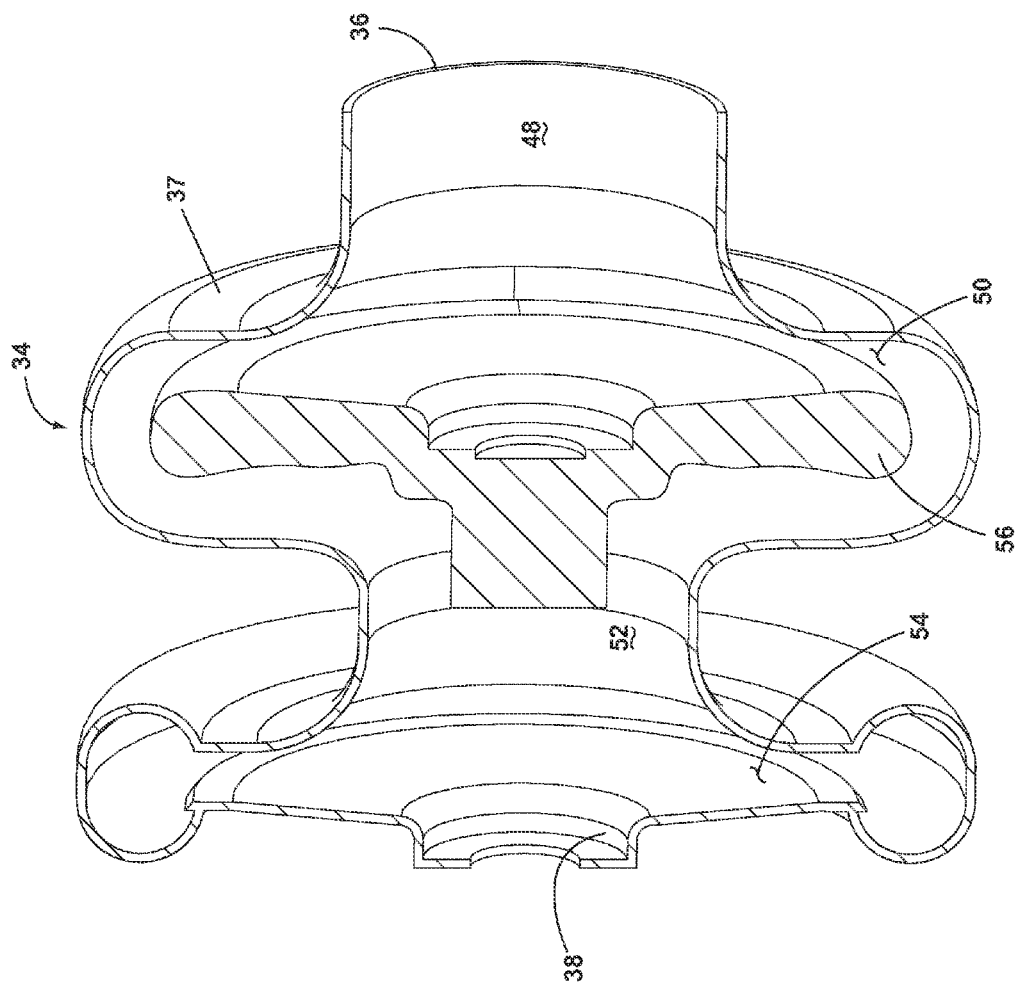
FIG. 6 is a longitudinal sectional view of a 2-stage compressor subassembly housing comprising a portion of the turbine engine of FIG. 1.
Figure 7:
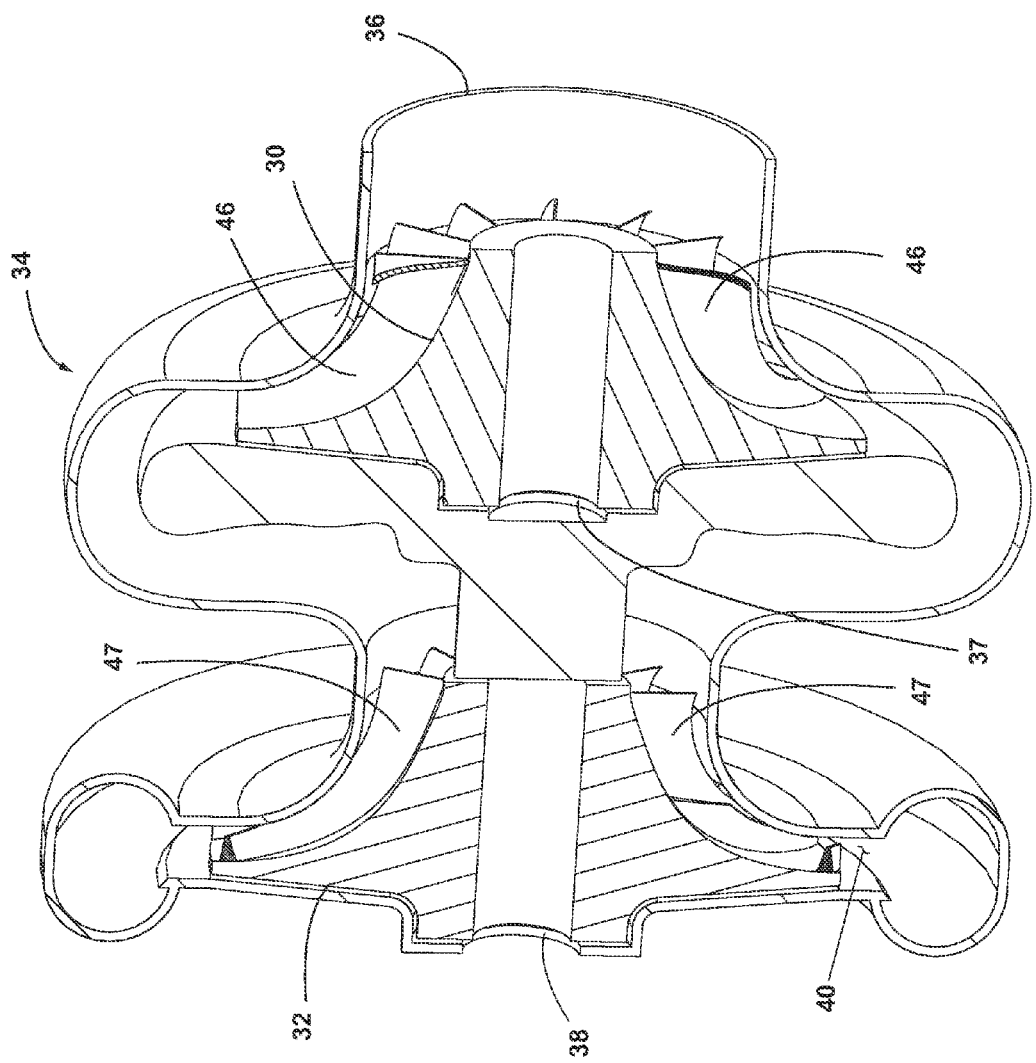
FIG. 7 is a longitudinal sectional view of the 2-stage compressor subassembly housing of FIG. 6, with 1 st and 2nd stage compressor rotors installed therein.

Referring additionally to FIGS. 6 and 7, the 2-stage compressor subassembly 16 includes a compressor housing 34 enclosing a stage 1 compressor rotor 30 and a stage 2 compressor rotor 32. The compressor housing 34 includes a generally cylindrical air inlet 36 transitioning to a compressor inlet throat 48, in turn opening into a stage 1 compressor chamber 50 enclosing a compressor rotor support frame 56. The stage 1 compressor chamber 50 is somewhat ovoid shaped, with a configuration suitable for enclosing the compressor rotor support frame 56, and rotatably enclosing the stage 1 compressor rotor 30. The compressor rotor support frame 56 can be fixedly attached, such as by radially disposed brackets, to the compressor housing 34 to prevent rotation thereof. However attached, the compressor rotor support frame 56 must be spaced from the compressor housing 34 to enable airflow around the compressor rotor support frame 56 and through the stage 1 compressor chamber 50.

The stage 1 compressor chamber 50 can transition to an intermediate compressor throat 52, which in turn can open into a stage 2 compressor chamber 54. The stage 2 compressor chamber 54 is a similar shaped, albeit somewhat flatter, enclosure suitable for rotatably housing the stage 2 compressor rotor 32. As shown in FIG. 3, the perimeter of the compressor housing 34 associated with the stage 2 compressor chamber 54 can include a plurality of regularly spaced outflow openings 42.

The compressor rotor support frame 56 can include a suitable bearing 37 for rotatable support of the stage 1 compressor rotor 30. The stage 2 compressor chamber 54 can include a rear bearing 38 for rotatably supporting the stage 2 compressor rotor 32. The compressor rotor support frame 56 can also include a bearing to support the upstream end of the stage 2 compressor rotor 32, as shown in FIG. 7.

The air inlet 36, compressor inlet throat 48, stage 1 compressor chamber 50, intermediate compressor throat 52, stage 2 compressor chamber 54, compressor rotor support frame 56, and stage 1 and 2 compressor rotors 30, 32 are coaxially aligned. Both compressor rotors 30, 32 can be fixedly coupled with the turbine shaft 24 for coordinated rotation.

The intermediate compressor throat 52 can include a fogger nozzle 44 fluidly coupled with a source of liquid, such as water, for conditioning the air to a selected humidity. Air humidity can be monitored during flow through the 2-stage compressor subassembly 16 by known moisture sensors (not shown) for controlling the dispersal of liquid through the fogger nozzle 44.

The compressor rotors 30, 32 can be a generally known rotor including a plurality of regularly spaced rotor vanes 46, 47, respectively, so that turning of the rotors 30, 32 will draw air in through the air inlet 36 and the compressor inlet throat 48, to be urged radially away from the rotor 30 into the stage 1 compressor chamber 50. The air will flow around the compressor rotor support frame 56 to enter the intermediate compressor throat 52. The stage 2 compressor rotor will draw air through the intermediate compressor throat 52 to be urged radially outwardly through an outflow plenum 40 into the stage 2 compressor chamber 54. The air can then exit the stage 2 compressor chamber 54 through the outflow openings 42. The exiting air can be compressed, heated by compression, and moisturized by the 2-stage compressor subassembly 16.

Figure 8:
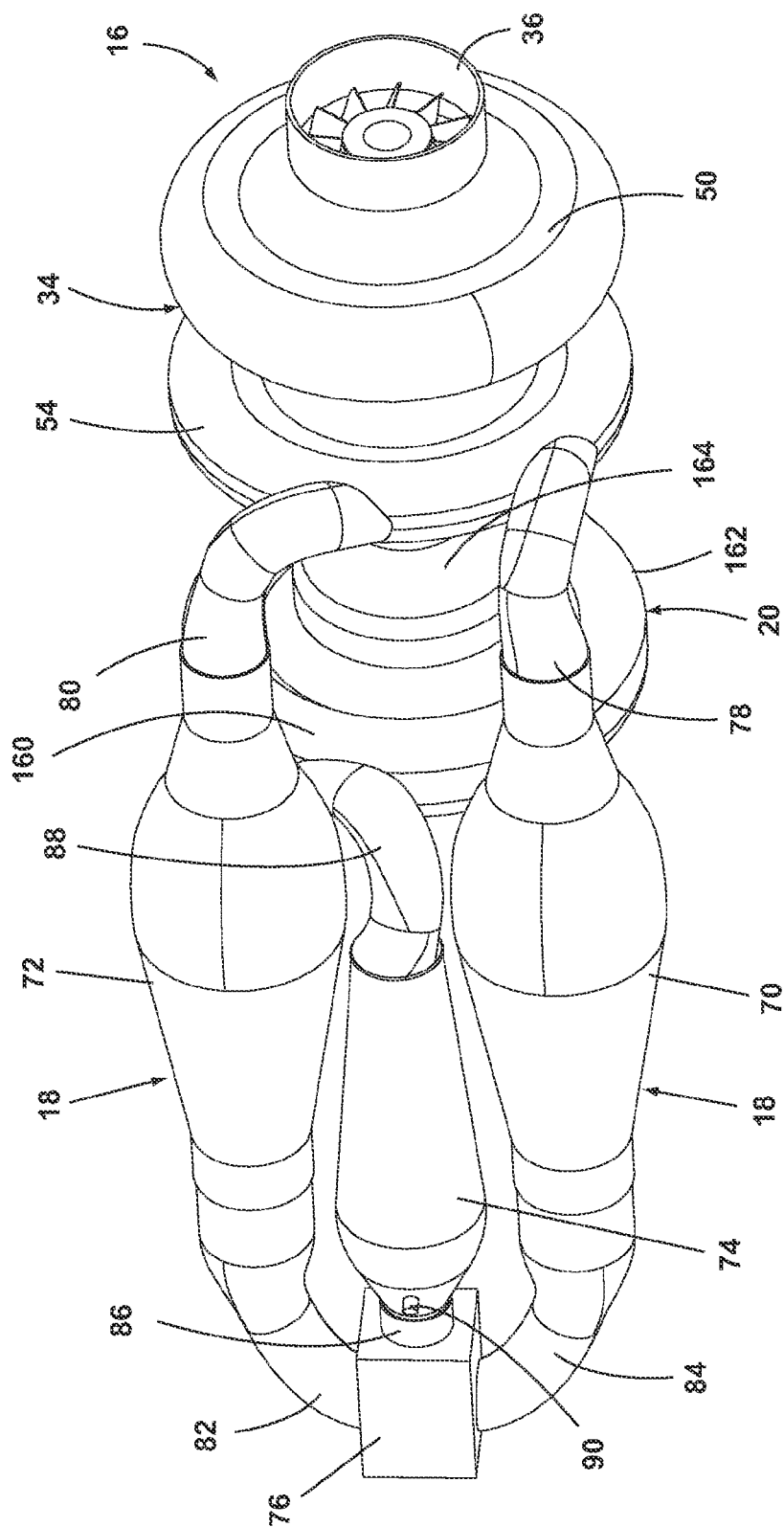
FIG. 8 is a perspective view of a portion of the turbine engine of FIG. 1 including the 2-stage compressor subassembly, a mid-turbine subassembly, and a combustion subassembly fluidly coupled therewith and including right and left electrostatic subassemblies, and a combustion chamber subassembly.

The 2-stage compressor subassembly 16 is fluidly coupled with the combustion subassemblies 18. FIG. 8 illustrates the 2-stage compressor subassembly 16, the mid-turbine subassembly 20, and a combustion subassembly 18, with all other components of the turbine engine assembly 10 removed for clarity. Thus, for example, the turbine engine assembly 10 can include 2 or more additional combustion subassemblies 18 distributed about the compressor subassembly 16 and mid-turbine subassembly 20.

The combustion subassemblies 18 are identical. Thus, only one subassembly 18 will be described herein, with the understanding that the description applies to all subassemblies 18 unless otherwise noted.

The combustion subassembly 18 includes (viewing the subassembly in a direction from the mid-turbine subassembly 20 toward the compressor subassembly 16) a right electrostatic subassembly 70 and a left electrostatic subassembly 72. Intermediate the electrostatic subassemblies 70, 72, and extending generally parallel thereto is a combustion chamber subassembly 74. As FIG. 8 illustrates, the electrostatic subassemblies 70, 72, are fluidly coupled with the stage 2 compressor chamber 54 through right and left inlet tube assemblies 78, 80. The combustion chamber subassembly 74 is fluidly coupled with the mid-turbine subassembly 20 through a combustion chamber outlet tube 88. The electrostatic subassemblies 70, 72 are fluidly coupled through right and left outlet tube assemblies 82, 84 with an electrostatic manifold 76, which is fluidly coupled with the combustion chamber subassembly 74 through a combustion chamber inlet tube 86.

Figure 9:
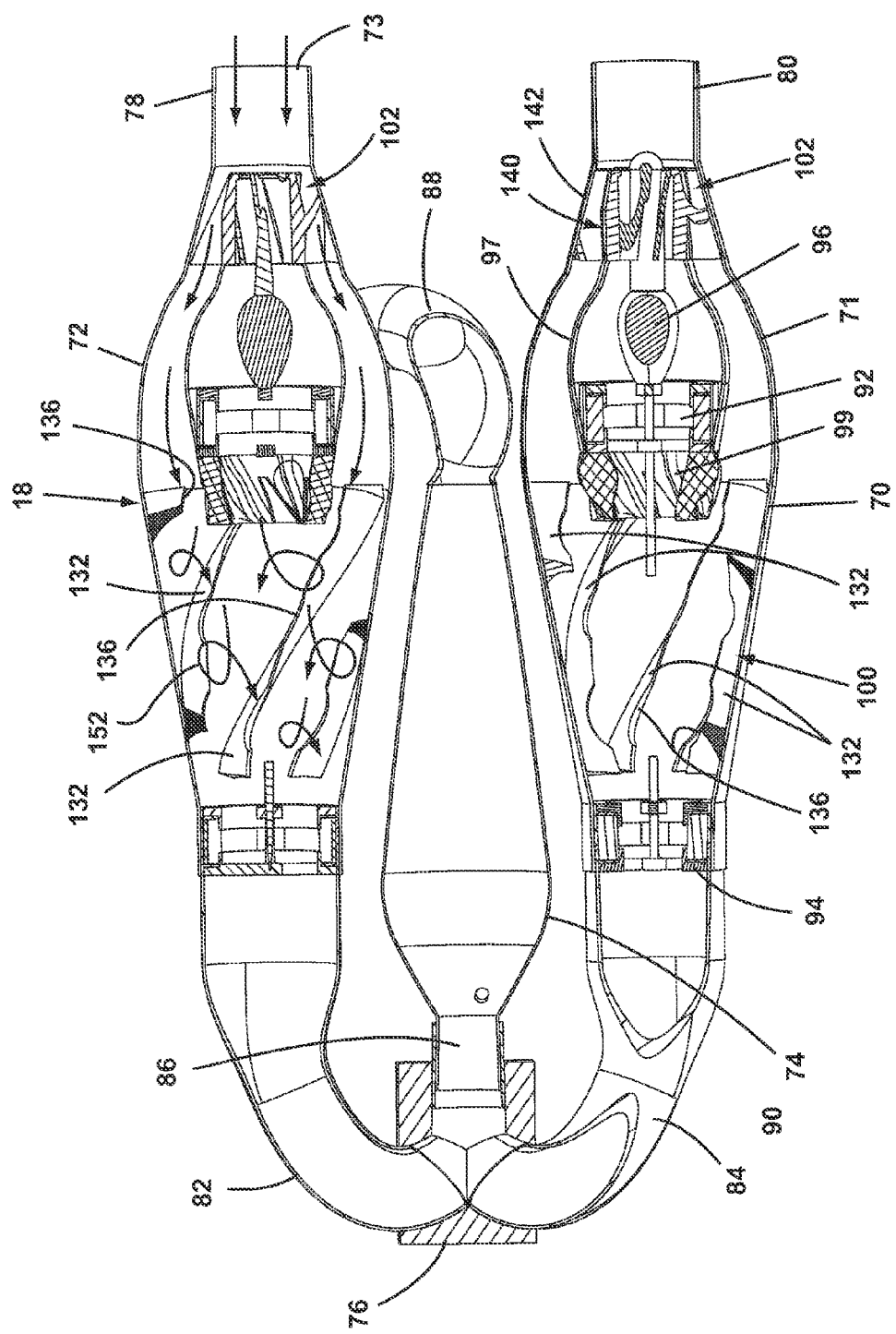
FIG. 9 is a longitudinal sectional view of the combustion subassembly illustrated in FIG. 8 taken along the centerline.
Figure 10:
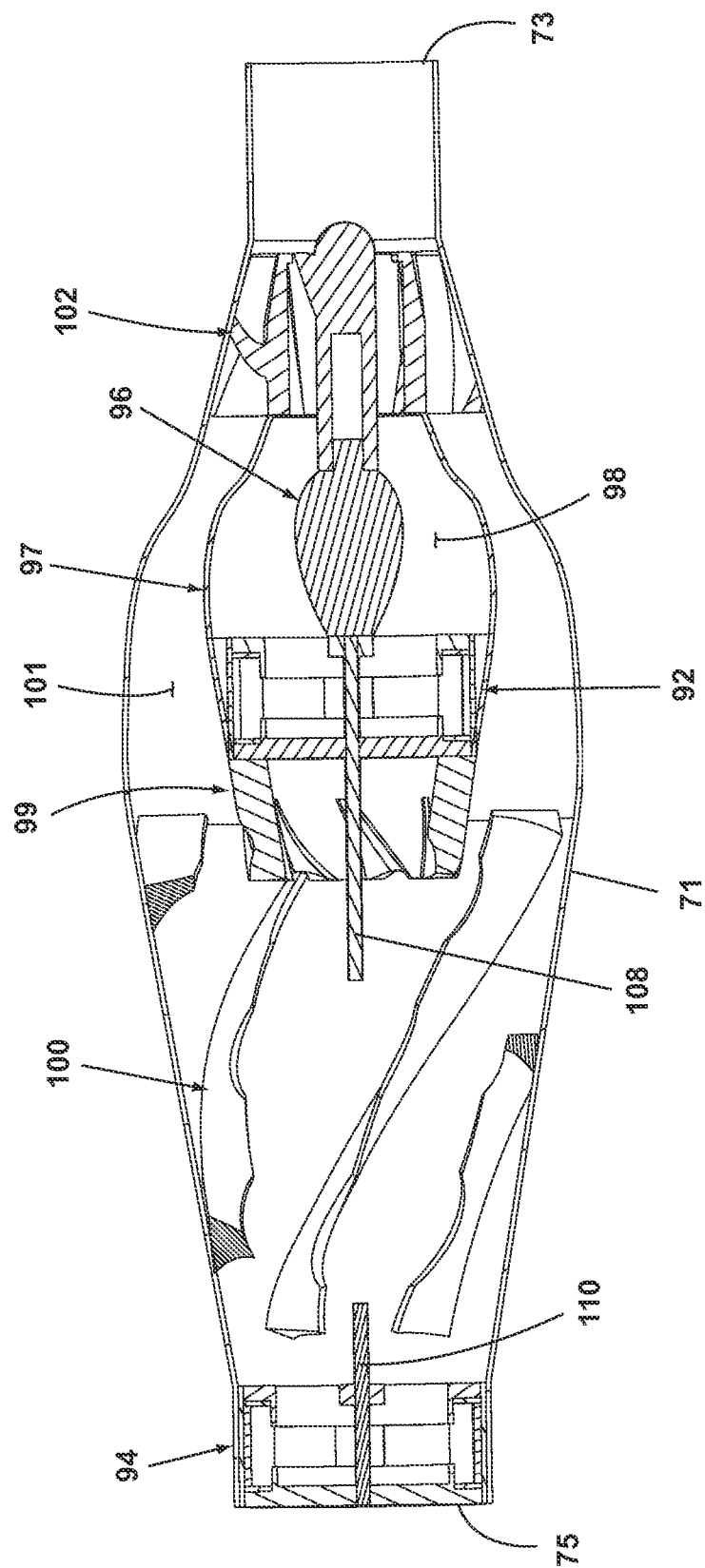
FIG. 10 is a longitudinal sectional view of an electrostatic subassembly illustrated in FIG. 9 taken along the centerline.
Figure 11:
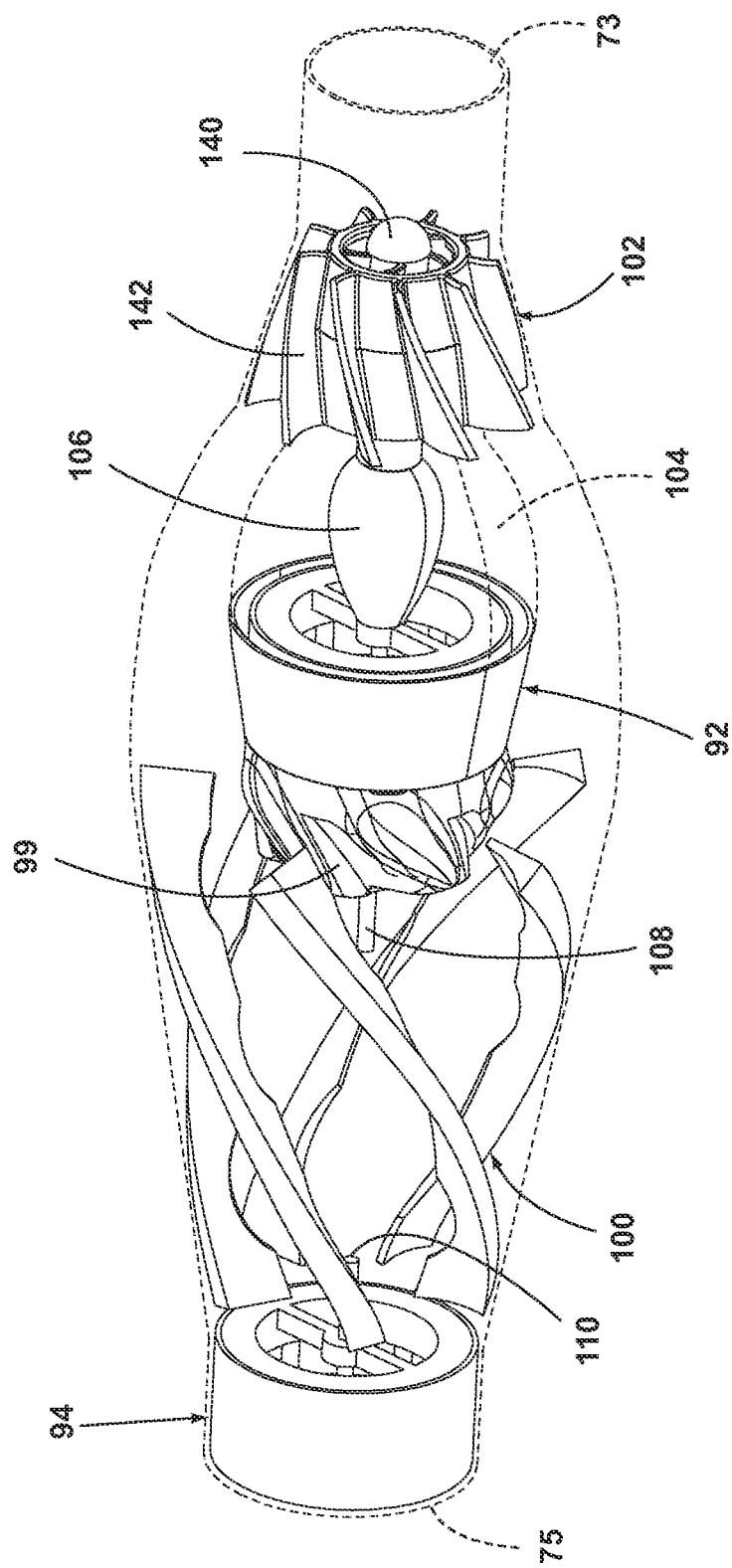
FIG. 11 is a perspective semi-transparent view of the electrostatic subassembly illustrated in FIG. 9.

FIGS. 9, 10, and 11 illustrate the electrostatic subassemblies 70, 72 and the combustion chamber subassembly 74. The right electrostatic subassembly 70 is identical to the left electrostatic subassembly 72. Thus, only the right electrostatic subassembly 70 will be described herein.

The right electrostatic subassembly 70 includes an elongated housing 71 shaped somewhat like a bowling pin, having a narrow upstream inlet 73 transitioning somewhat abruptly to a wider section, in turn transitioning gradually to a narrow downstream outlet 75. Within the housing 71 an air splitter housing 97 is coaxially disposed. The air splitter housing 97 includes, in part, an interior housing assembly 104 including a forward shell 144 and a rear shell 146. The air splitter housing 97 also is shaped somewhat like a bowling pin, or an egg, including a narrow upstream inlet 91, transitioning somewhat abruptly to a wider section, in turn transitioning somewhat abruptly to a narrow downstream outlet 93.

The air splitter housing 97 defines an air splitter chamber 98, encloses an air splitter assembly 96 including an egg-shaped air splitter 106, and is coupled at a downstream end with a forward magnet assembly 92. A somewhat annular outer flow chamber 101 is defined by the space between the housing 71 and the air splitter housing 97, and extending approximately from the upstream inlet 73 to a vortex collar 99. An inner volute splitter 140 can be fixedly received within the upstream inlet 91 of the air splitter housing 97. Concentrically disposed with the narrow upstream inlet 73 of the housing 71 and the inner volute splitter 140 is an outer volute splitter 142 in coaxial disposition with the air splitter housing 97. The inner volute splitter 140 is configured to direct air through the splitter into the air splitter chamber 98. The outer volute splitter 142 is configured to direct air around the air splitter housing 97.

The upstream end of the air splitter 106 is concentrically coupled with the inner volute 140. The downstream end of the air splitter 106 transitions to a forward electrode 108. The forward electrode 108 is an elongated rod-like member that extends concentrically through the forward magnet assembly 92 and a vortex collar 99.

Referring specifically to FIGS. 10 and 11, the forward magnet assembly 92 comprises a generally circular, plate-like, forward magnet anterior electrode brace 112 and a generally circular, plate-like, forward magnet posterior electrode brace 114 in parallel, coaxial disposition. Referring also to FIGS. 12A, 12B, 13, and 14, the electrode braces 112, 114 include an annular flange 184, 186, respectively, defining a circular opening 188, 190 therethrough. Diametrically traversing the opening 188, 190, are electrode support members 192, 194. The midpoint of each support member 192, 194 includes an electrode support ring 196, 198 for receipt of an electrode therethrough. Extending orthogonally to the annular flange 184, 186, and circumscribing the opening 188, 190 is a circular raised wall 206, 208 concentric with the annular flange 184, 186.

The forward composite magnet 116 and the rear composite magnet 126 are identical, except for having opposite polarity, e.g. magnet 116 is positive or "North," and magnet 126 is negative, or "South," as are the forward magnet assembly 92 and the rear magnet assembly 94. Thus, except for the difference in polarity, the following description of the forward composite magnet 116 and forward magnet assembly 92 will apply also to the rear composite magnet 126 and a rear magnet assembly 94, except as otherwise indicated.

Figure 12:
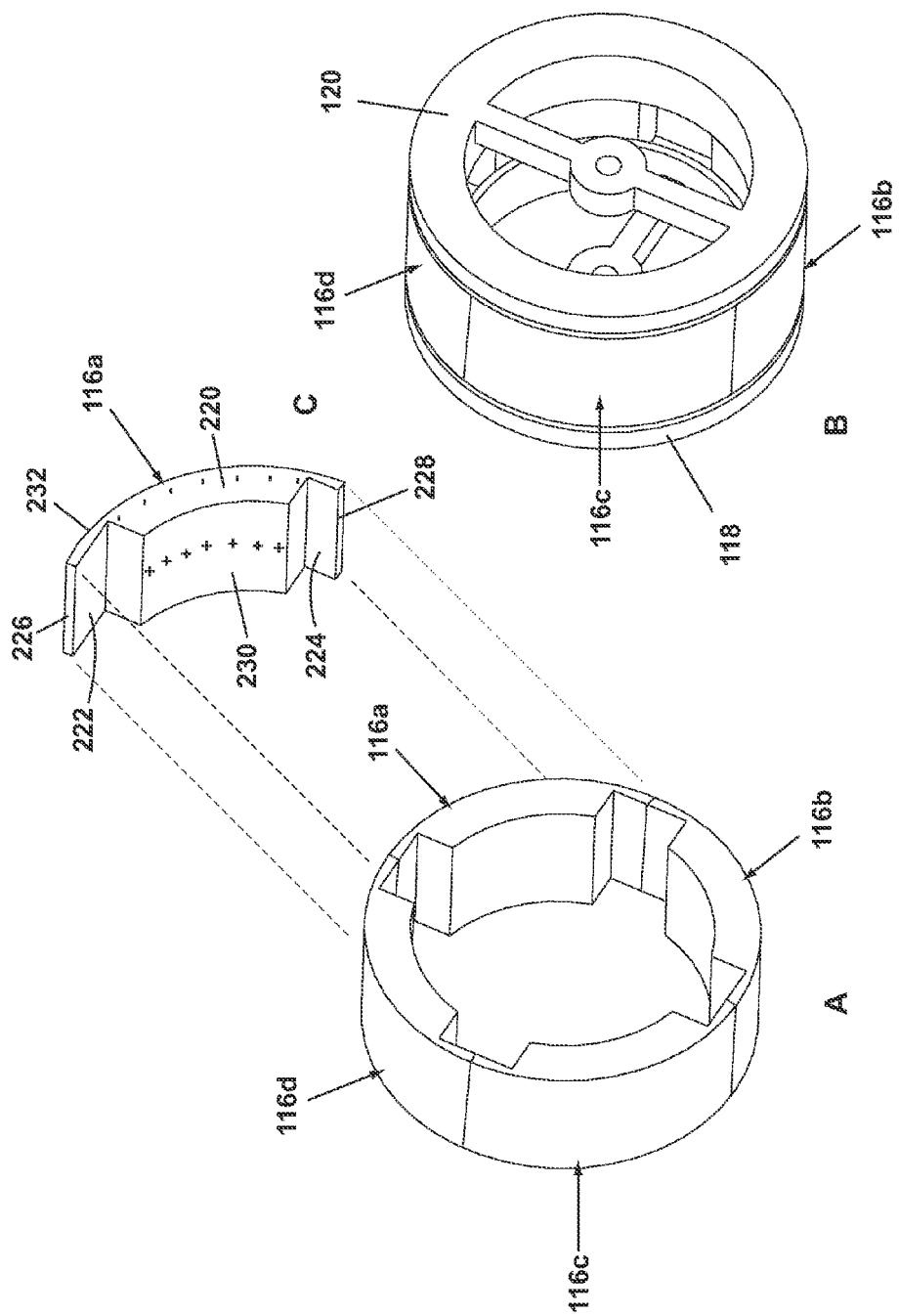
FIG. 12A is a perspective view of a magnet assembly comprising part of the electrostatic subassembly illustrated in FIG. 10.
FIG. 12B is a perspective view of a partial assembly including the magnet assembly illustrated in FIG. 12A interposed between a pair of electrostatic magnet braces as illustrated in FIG. 10.
FIG. 12C is a perspective view of a magnet comprising part of the magnet assembly illustrated in FIG. 12A showing an exemplary distribution of polarities for the magnet.
Figure 13:
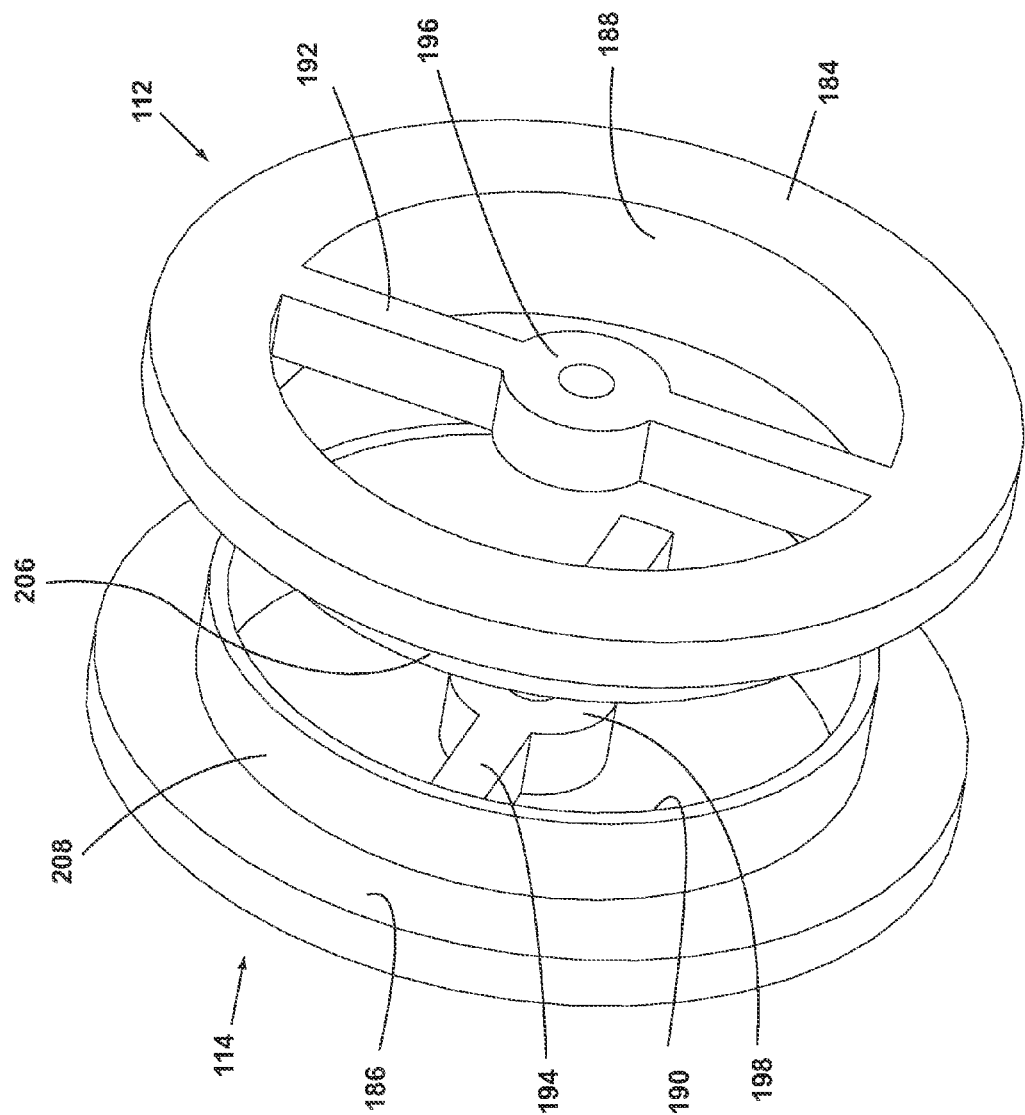
FIG. 13 is an enlarged perspective view of the electrostatic magnet braces illustrated in FIG. 12B.
Figure 14:
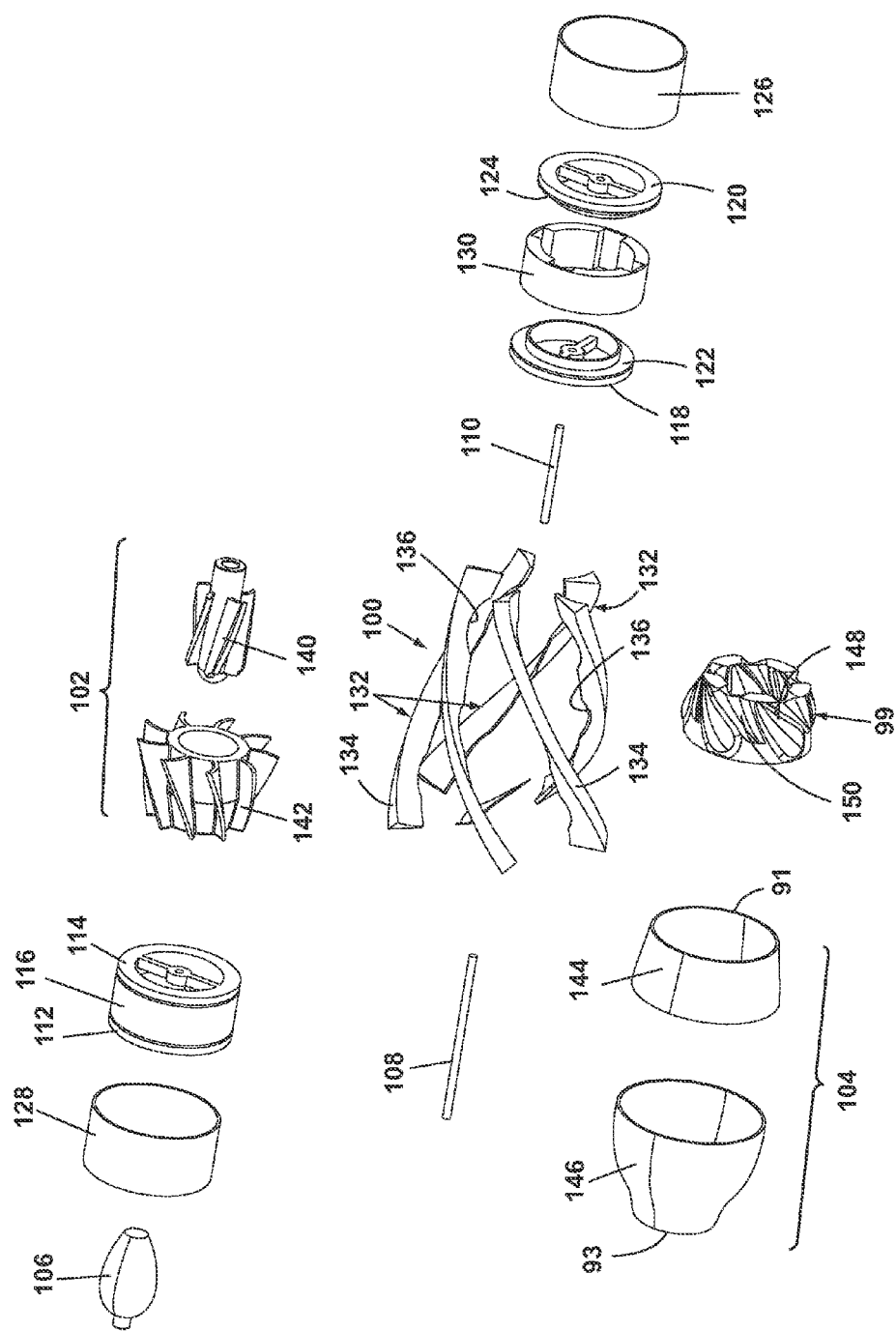
FIG. 14 is an exploded view of the electrostatic subassembly illustrated in FIG. 10.

Referring again to FIGS. 12A and B, and to FIG. 12C, a forward composite magnet 116 (which is identical in configuration to a rear composite magnet 126) includes 4 identical arcuate elements 116a, 116b, 116c, 116d, each defined by a central angle of 90°. Referring to element 116a, each element includes a truncated somewhat sector-shaped portion 220 bounded on each side by a relatively thin arcuate wall portion 222, 224. The wall portions 222, 224 terminate in planar edges 226, 228. The sector-shaped portion 220 defines an inner surface 230, and the arcuate element 116a defines an outer surface 232. When the elements 116a-d are joined to form the composite magnet 116, the edge portions 226, 228 will abut, providing polarity continuity over the composite magnet 116.

The arcuate element 116a can be a magnet including a negative polarity along the outer surface 232 and a positive polarity along the inner surface 230. At a curved surface (not shown) intermediate the inner and outer surfaces, there will be an absence of polarity. When the arcuate elements 116a-d are joined, the resulting composite magnet 116 will have a positive polarity along the inner surface 230 and a negative polarity along the outer surface 232.

The arcuate elements 16a-d can be configured to circumscribe the raise walls 206, 208 of the electrode braces 112, 114, so that the inner surfaces 230 are in contact with the raised walls 206, 208. The outer circumference of the composite magnet 116 can be coaxial with the outer circumference of the annular flanges 184, 186 of the electrode braces 112, 114. The electrode braces 112, 114 can be oriented so that the support members 192, 194 are positioned at complementary right angles to provide enhanced stability to the electrodes 108, 110 supported thereby.

The electrode braces 112, 114 can be fabricated of an electromagnetic conductive material. Electromagnetic isolation of the composite magnet 116 can be accomplished by interposing non-conductive magnet spacers 122, 124, having the same diameter as the annular flanges 184, 186, between the composite magnet 116 and the braces 112, 114. Thus, a negative charge will remain confined to the outer circumference of the composite magnet 116. However, because the inner circumference of the composite magnet 116 will contact the magnet braces 112, 114 through the raised walls 206, 208, a positive charge will be distributed over the inner surface 230 of the composite magnet 116, and over the electrode braces 112, 114. An electrode 108 coupled electromagnetically with the magnet electrode braces 112, 114 through the electrode support rings 196, 198 will also have a positive polarity or charge.

Referring again to FIG. 14, an annular magnet assembly sleeve 128 can slidably receive the assembled electrode braces, annular spacers, and magnet.

Except for polarity, the forward magnet assembly 92 is identical to the rear magnet assembly 94. The magnets 116, 126 are also identical, except for polarity, as are the magnetic assembly sleeves 128, 130. The forward electrode braces 112, 114 are identical to the rear electrode braces 118, 120. The annular spacers 122, 124 can be incorporated into both assemblies 92, 94.

Figure 15:
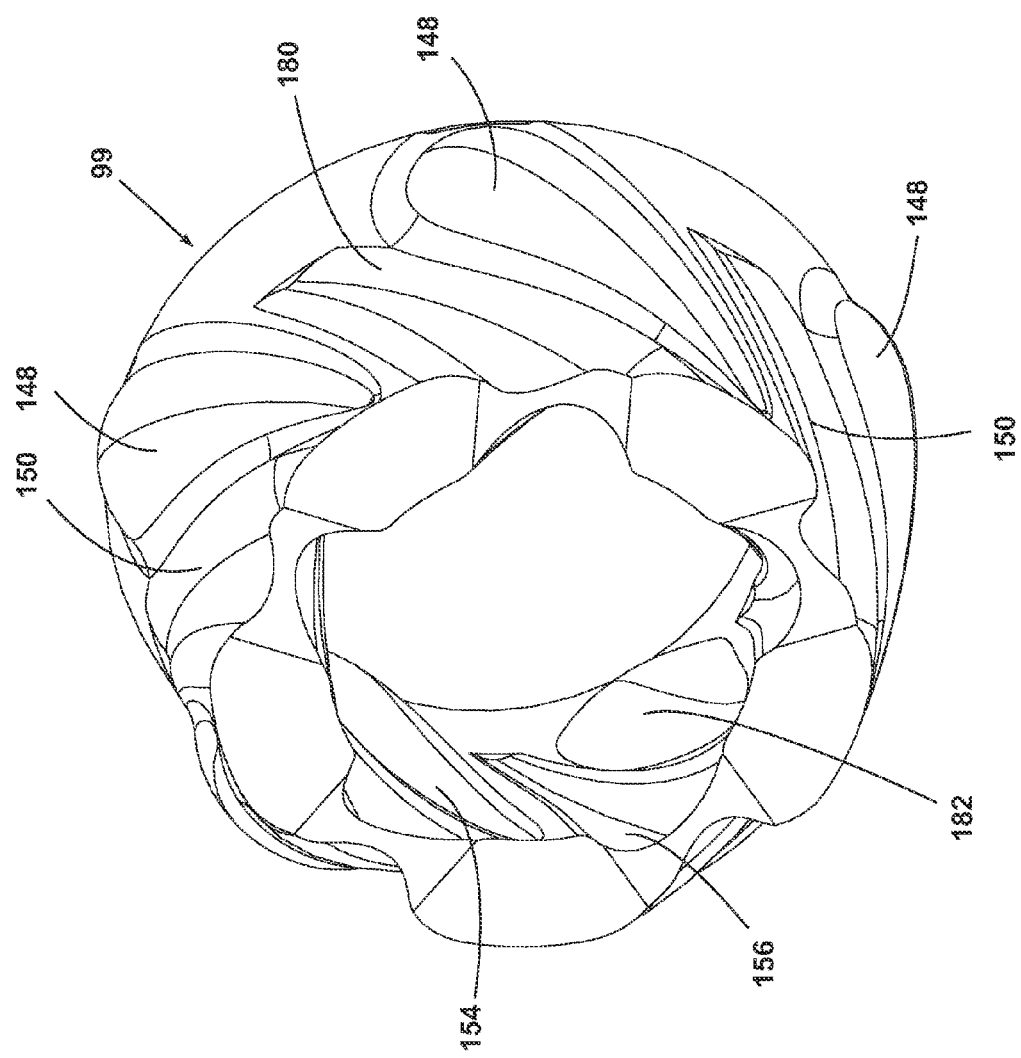
FIG. 15 is an enlarged perspective view of a vortex collar comprising a portion of the electrostatic subassembly illustrated in FIG. 10.

Referring again to FIGS. 11 and 14, immediately downstream of the forward magnet assembly 92 and the air splitter housing 97 is a vortex collar 99. Referring also to FIG. 15, the vortex collar 99 is a somewhat annular body having a gradually decreasing lateral dimension in the downstream direction. A plurality of outer protrusions 148 extends from the upstream end to the downstream end at an angle to the longitudinal axis of the vortex collar 99. The outer protrusions 148 are separated by outer depressions 150 to form a somewhat undulating outer surface 180 having a somewhat helical twist.

A plurality of inner protrusions 154 extends from the upstream end to the downstream end at an angle to the longitudinal axis of the vortex collar 99. The inner protrusions 154 are separated by inner depressions 156 to form a somewhat undulating inner surface 182 having a somewhat helical twist. Air flowing over the outer surface 180 will be urged in a vortex motion 152 by the protrusions 148 and depressions 150, and air flowing through the vortex collar 99 will be urged in a vortex motion 154 by the inner protrusions 154 and inner depressions 156. The direction of twisting of the outer vortex collar surface 180 must be the same as the direction of twisting of the outer volute splitter 142, and in an opposite direction to the direction of twisting of the inner vortex collar surface 182 and the inner volute splitter 140.

Extending from the vortex collar 99 to the rear magnet assembly 94 is a vortex blade assembly 100 including a plurality of vortex blades 132. The vortex blades 132 are thin members having a twisted configuration defining a curved outer blade edge 134 and a curved inner blade edge 136. The outer blade edge 134 is configured for fixed contact with the inner surface of the electrostatic subassembly housing 71. The inner blade edge 136 can be provided with additional undulations extending therealong to enhance the development and maintenance of air turbulence.

Because of the alignment of the positive and negative polarities of the arcuate elements 116a-d, the arcuate elements will be urged apart unless restrained. The forward magnet assembly sleeve 128 will circumscribe the composite magnet 116 and braces 112, 114, to maintain the assembly in a selected configuration. It will be recognized that the magnet assembly sleeve 128 can either be fabricated of an electromagnetically inert material, or coated along the inner surface with an electromagnetically inert material to prevent magnetic coupling of the composite magnet 116 with the braces 112, 114.

The rear magnet assembly 94 will be virtually identical to the forward magnet assembly 92, with one exception. In the rear magnet assembly 94, the arcuate elements 116a-d making up the composite magnet will have a polarity opposite to that of the forward magnet assembly 92. In other words, the arcuate elements will have a negative polarity along the inner surface, and a positive polarity along the outer surface. In contrast with the forward magnet assembly 92, a rear electrode 110 will have a negative polarity. Thus, there will be a strong electromagnetic attraction between the forward electrode 108 and the rear electrode 110.

Although the composite magnet has been described herein as including 4 arcuate elements, a greater or fewer number of elements can be utilized, as appropriate, including a single element magnet having the same overall configuration as the composite magnet.

Figure 16:
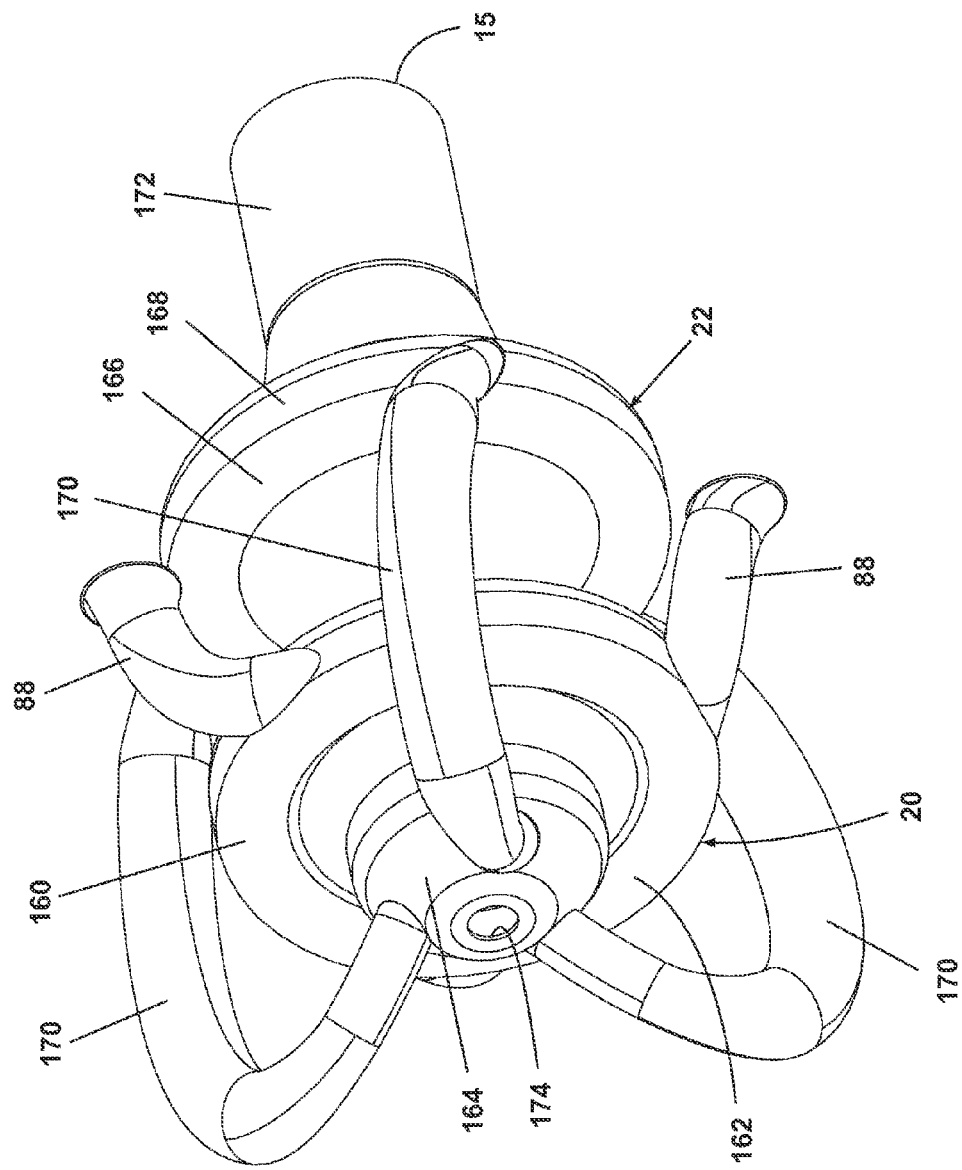
FIG. 16 is a perspective view of a portion of the turbine engine of FIG. 1, including the mid-turbine subassembly fluidly coupled with the rear turbine subassembly through connector tubes.
Figure 17:
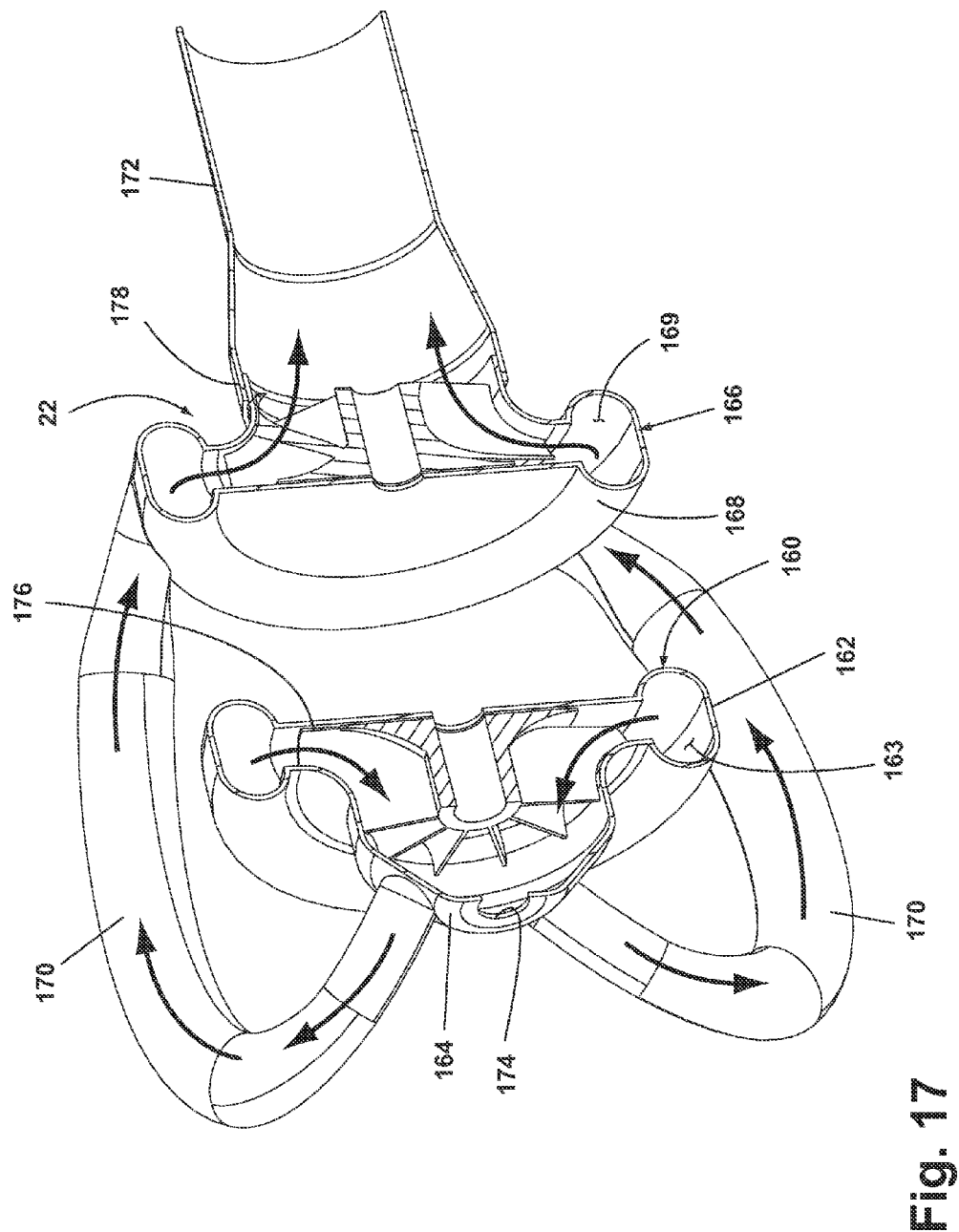
FIG. 17 is a longitudinal sectional view of the mid-turbine and a rear turbine subassemblies and connector tubes shown in FIG. 16 with turbine rotors installed therein taken along the centerline.

Returning again to FIG. 5 and to FIGS. 16 and 17, the mid-turbine subassembly 20 includes a somewhat hat-shaped mid-turbine subassembly housing 160 including a circumscribing inlet ring 162, transitioning to a protruding accumulation chamber 164. Each of the combustion chambers is exhausted through a combustion chamber outlet tube 88. The 3 outlet tubes 88 are fluidly coupled with the inlet ring 162 at regularly spaced intervals, i.e., 120°. Fluidly coupled with the accumulation chamber 164 are 3 turbine housing connector tubes 170 at regularly spaced intervals, i.e. 120°. The outlet tubes 88 and connector tubes 170 can be alternately disposed to avoid any interference between the tubes.

As illustrated in FIG. 17, the inlet ring 162 is a somewhat tire-shaped body defining a mid-turbine inlet chamber 163, which transitions to the accumulation chamber 164. The accumulation chamber 164 includes a concentrically disposed turbine shaft opening 174 for rotatable disposition of the turbine shaft 24 therethrough. A mid-turbine rotor 176 is housed within a portion of the mid-turbine inlet chamber 163 and accumulation chamber 164. The rotor 176 includes a plurality of rotor vanes configured to withdraw gases from the mid-turbine inlet chamber 163, and deliver the gases to the accumulation chamber 164 with the rotation of the mid-turbine rotor 176.

The rear turbine subassembly 22 includes a somewhat tire-shaped rear turbine subassembly housing 166 including a circumscribing inlet ring 168 to define a rear turbine inlet chamber 169, transitioning through an exhaust outlet housing 172 to the exhaust outlet 15. The rear turbine inlet chamber 169 and transitioning portion of the exhaust outlet housing 172 houses a rear turbine rotor 178. The rear turbine rotor 178 includes a plurality of rotor vanes configured to withdraw gases from the rear turbine inlet chamber 169, and exhaust gases through the exhaust outlet housing 172, and exhaust outlet 15. The rotors 176, 178 are fixedly coupled with the turbine shaft 24 for coordinated rotation.

The accumulation chamber 164 of the mid-turbine subassembly housing 160 is fluidly coupled with the rear turbine inlet chamber 169 through the 3 turbine housing connector tubes 170. Thus, exhaust gases are exhausted through the accumulation chamber 164, and out the housing connector tubes 170, into the rear turbine inlet chamber 169, and through the exhaust outlet housing 172 by rotation of the mid-turbine rotor 176 and the rear turbine rotor 178. The rotor vanes can be configured to optimize the torque provided to the turbine shaft 24 by the rotors 176, 178.

Operation of the turbine engine assembly 10 will now be described with reference to the Figures. The turbine engine assembly 10 can be mounted to a vehicle at a suitable location, preferably providing an unobstructed flow of air into the air inlet 13. As the vehicle moves forward, air is taken in through the air inlet 13 and is channeled to the air inlet 36 at the intake side of the 2-stage compressor subassembly 16. Alternatively, the turbine engine assembly 10 can incorporate an alternator and a starter (not shown) coupled with the turbine shaft, such as between the 2-stage compressor subassembly 16 and the mid-turbine subassembly 20. As the air travels through the 2-stage compressor subassembly 16, the air is compressed, heated by compression, and moisturized. The air can be conditioned to a selected humidity by the addition of moisture from the fogger nozzle 44.

The air leaves the stage 2 compressor chamber 54 through 6 outlets, i.e. the 3 right inlet tube assemblies 78 and the 3 left inlet tube assemblies 80, to enter the 3 right electrostatic subassemblies 70 and the 3 left electrostatic subassemblies 72. In short, the compressed air enters 3 upstream openings 210 to the 3 right electrostatic subassembly housings 71, and the 3 upstream openings 212 to the 3 left electrostatic subassembly housings 73. Upon entering the openings 210, 212, the air is divided, with a first portion passing through the inner volute splitter 140 and a second portion passing through the outer volute splitter 142. The air must be urged into opposite rotation. For example, air passing through the inner volute splitter 140 can be urged into a clockwise direction, and the air passing through the outer volute splitter 142 can be urged into a counterclockwise direction.

The first portion exits the inner volute splitter 140 into the air splitter chamber 98. The second portion exits the outer volute splitter 142 into the outer flow chamber 101.

In the air splitter chamber 98, the first portion of the air is urged into rotation and turbulence by the inner volute splitter 140 and the air splitter 106. As the air passes over the air splitter 106, numerous small vortices are generated. The air then passes from the air splitter chamber 98 through the forward magnet assembly 92 where it can be partially ionized by the polarity of the magnet assembly 92. Exiting the forward magnet assembly 92, the air passes through the interior of the vortex collar 99, where further turbulence and vortices are developed.

Concurrently, the second portion of air flows through the outer volute splitter 142 and is urged into rotation and turbulence. The orientation of the outer volute splitter 142 can differ from the orientation of the inner volute splitter 140 to develop opposite air rotation. The "twist" direction of the outer volute splitter 142 must be the same as the "twist" direction of the protrusions 148 and depressions 150 of the outer surface 180. The "twist" direction of the inner volute splitter 140 must be the same as the "twist" direction of the inner protrusions 154 and inner depressions 156 of the inner surface 182. The second portion of air then flows through the outer flow chamber 101 and over the vortex collar 99. The outer protrusions 148 and outer depressions 150 urge the second portion of air into further turbulence and vortices. After the first and second portions exit the vortex collar 99, the portions combine, creating additional turbulence and vortices. The vortex blades 132 also impart additional rotation and turbulence to the air.

As previously described, the forward magnet assembly 92 can impart a positive or negative polarity to the forward electrode 108. The polarity can effectively be concentrated at the exposed end of the electrode by sheathing the electrode in a nonconductive material from the forward magnet posterior electrode brace 114 to just short of the end of the electrode 108. Preferably, the forward electrode 108 will have a positive polarity and the rear electrode 110 will have a negative polarity. The strong polarity difference between the electrodes 108, 110, along with the heat, moisture, and turbulence of the air, can trigger a significant discharge of static electricity from one electrode to the other. This discharge can ionize the moisture molecules into ionic hydrogen and oxygen. The discharge can be continuous, or intermittent. In the latter case, the presence of 6 electrostatic subassemblies operating concurrently will result in a generally continuous supply of ionic hydrogen and oxygen.

The ionic hydrogen and oxygen are discharged from the electrostatic subassemblies into the electrostatic manifold 76. From the electrostatic manifold 76 the ionic hydrogen and oxygen are introduced through the combustion chamber inlet tube 86 into the combustion chamber subassembly 74. An igniter 90 can be actuated for combustion of the ionized hydrogen within the combustion chamber subassembly 74 or the manifold 76.

The combustion products are then exhausted through the combustion chamber outlet tube 88 into the mid-turbine subassembly 20, where the flow urges rotation of the mid-turbine rotor 176. The combustion products then flow into the accumulation chamber 164 to exit through the turbine housing connector tubes 170. From the turbine housing connector tubes 170, the combustion products enter the rear turbine subassembly 22, where the flow urges rotation of the rear turbine rotor 178. The results of the rotation of these two rotors coupled with the turbine shaft 24 rotates the turbine shaft 24 and, if utilized, the transfer shaft 26. Appropriate coupling of the transfer shaft 26, or the turbine shaft 24, to a vehicle drive shaft or other drivetrain components will provide additional rotational power to the vehicle drive train. The rotation of the 2 rotors coupled with the turbine shaft 24 can also rotate the 2-stage compressor subassembly 16.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A turbine engine for a vehicle, said turbine engine comprising:
   a turbine shaft coupleable with a vehicle drive shaft;
   an air inlet for receiving a flow of air therethrough, fluidly coupleable with an air compressor subassembly;
   said air compressor subassembly for compressing air flowing through said air inlet, fluidly coupleable with a combustion subassembly;
   said combustion subassembly for generating and combusting ionic hydrogen, fluidly coupleable with a mid-turbine subassembly;
   said mid-turbine subassembly coupleable with said turbine shaft, fluidly coupleable with a rear turbine subassembly; and
   said rear turbine subassembly coupleable with said turbine shaft, fluidly coupleable with an exhaust outlet, for exhausting combustion products from said mid-turbine subassembly;
   said combustion subassembly including an electrostatic subassembly fluidly coupleable with a combustion chamber subassembly;
   said combustion chamber subassembly fluidly coupleable with said mid-turbine subassembly;
   whereby said air compressor subassembly can compress and humidify said air, said electrostatic subassembly can generate ionic hydrogen from said compressed and humidified air, said combustion chamber subassembly can combust said ionic hydrogen, and said mid-turbine subassembly and rear turbine subassembly can rotate with said flow of combustion products therethrough; and
   whereby said turbine shaft and a drive shaft can rotate with rotation of said mid-turbine subassembly and rear turbine subassembly.

2. A turbine engine according to claim 1 wherein said electrostatic subassembly includes an electrostatic subassembly housing enclosing a first electrode brace for supporting a first electrode and a first magnet.

3. A turbine engine according to claim 2, and further including an egg-shaped air splitter.

4. A turbine engine according to claim 3, and further including an outer volute splitter coaxially disposed with an inner volute splitter.

5. A turbine engine for a vehicle, said turbine engine comprising:
   a turbine shaft coupleable with a vehicle drive shaft;
   an air inlet for receiving a flow of air therethrough, fluidly coupleable with an air compressor subassembly;
   an egg-shaped air splitter;
   an outer volute splitter coaxially disposed with an inner volute splitter
   said air compressor subassembly for compressing air flowing through said air inlet, fluidly coupleable with a combustion subassembly;
   said combustion subassembly for generating and combusting ionic hydrogen, fluidly coupleable with a mid-turbine subassembly;
   said mid-turbine subassembly coupleable with said turbine shaft, fluidly coupleable with a rear turbine subassembly;
   said rear turbine subassembly coupleable with said turbine shaft, fluidly coupleable with an exhaust outlet, for exhausting combustion products from said mid-turbine subassembly;
   said combustion subassembly including an electrostatic subassembly with an electrostatic subassembly housing enclosing a first electrode brace for supporting a first electrode and a first magnet, said electrostatic subassembly fluidly coupleable with a combustion chamber subassembly; and
   said combustion chamber subassembly fluidly coupleable with said mid-turbine subassembly;
   whereby said air compressor subassembly can compress and humidify said air, said electrostatic subassembly can generate ionic hydrogen from said compressed and humidified air, said combustion chamber subassembly can combust said ionic hydrogen, and said mid-turbine subassembly and rear turbine subassembly can rotate with said flow of combustion products therethrough; and
   whereby said turbine shaft and a drive shaft can rotate with rotation of said mid-turbine subassembly and rear turbine subassembly.

6. A turbine engine according to claim 5 wherein said air compressor subassembly is a 2-stage air compressor subassembly including 2 compressor rotors.

7. A turbine engine according to claim 6 wherein said compressor rotors are coaxially aligned.

8. A turbine engine according to claim 6 wherein said compressor rotors are coupled with said turbine shaft.

9. A turbine engine according to claim 5 and further including a fogger nozzle.

10. A turbine engine according to claim 5 wherein said first electrode and first magnet have a selected polarity.

11. A turbine engine according to claim 5 wherein air passes through said outer volute splitter in a first rotation direction opposite air that passes through said inner volute splitter.

12. A turbine engine according to claim 11, and further including a vortex collar having an outer surface and an inner surface.

13. A turbine engine according to claim 12 wherein said outer surface is characterized by protrusions and depressions oriented in the same direction as the outer volute splitter, and the inner surface is characterized by protrusions and depressions oriented in the same direction as the inner volute splitter.

14. A turbine engine according to claim 13, and further comprising a second electrode brace for supporting a second electrode and a second magnet, said second electrode and second magnet having a polarity opposite the polarity of said first electrode and first magnet.

15. A turbine engine according to claim 14 wherein said polarity of said first electrode and said polarity of said second electrode enable generation of static electricity therebetween.

16. A turbine engine according to claim 15 wherein products of the combustion of said ionic hydrogen can flow into said mid-turbine subassembly.

17. A turbine engine according to claim 16 wherein products of the combustion of said ionic hydrogen can flow into said rear turbine subassembly.

18. A turbine engine according to claim 17 wherein said mid-turbine subassembly includes a first turbine rotor, and said rear turbine subassembly includes a second turbine rotor.

19. A turbine engine according to claim 17 wherein said first turbine rotor and said second turbine rotor are coupled with said turbine shaft.

\* \* \* \* \*